(12) United States Patent
Winborn

(10) Patent No.: US 10,480,701 B2
(45) Date of Patent: Nov. 19, 2019

(54) PIPELINE INSERTION APPARATUS AND METHOD

(71) Applicant: Craig V. Winborn, Midland, TX (US)

(72) Inventor: Craig V. Winborn, Midland, TX (US)

( * ) Notice: Subject to any disclaimer, the term of this patent is extended or adjusted under 35 U.S.C. 154(b) by 136 days.

(21) Appl. No.: 15/634,830

(22) Filed: Jun. 27, 2017

(65) Prior Publication Data

US 2018/0372256 A1 Dec. 27, 2018

(51) Int. Cl.
| | |
|---|---|
| *F16L 55/18* | (2006.01) |
| *F16L 41/06* | (2006.01) |
| *F16L 41/00* | (2006.01) |
| *B05B 13/06* | (2006.01) |
| *B05B 1/14* | (2006.01) |

(52) U.S. Cl.
CPC .......... *F16L 41/06* (2013.01); *B05B 13/0627* (2013.01); *F16L 41/008* (2013.01); *B05B 1/14* (2013.01)

(58) Field of Classification Search
CPC ......... F16L 41/04; F16L 41/06; F16L 41/005; G01N 1/2035; Y10T 137/612; Y10T 137/598
See application file for complete search history.

(56) References Cited

U.S. PATENT DOCUMENTS

| | | | |
|---|---|---|---|
| 3,812,722 A * | 5/1974 | Soudelier ............. | G01N 1/2035 73/863.82 |
| 4,120,313 A | 10/1978 | Lewis | |
| 4,179,920 A | 12/1979 | Schuller et al. | |
| 4,492,392 A | 1/1985 | Woods et al. | |
| 4,697,465 A | 10/1987 | Evans et al. | |
| 5,138,755 A | 8/1992 | Evans et al. | |
| 5,410,920 A * | 5/1995 | Westwick ............... | F16L 41/04 73/863.85 |
| 5,621,181 A * | 4/1997 | Waterman ............ | G01N 17/046 73/866.5 |
| 5,996,430 A * | 12/1999 | Bellis, Sr. ............ | G01N 1/2035 73/756 |
| 6,085,777 A * | 7/2000 | Welker ...................... | F17D 3/10 137/317 |
| 6,357,470 B1 | 3/2002 | Evans et al. | |
| 6,802,455 B1 | 10/2004 | Evans | |
| 8,359,937 B2 | 1/2013 | Evans et al. | |
| RE46,378 E | 4/2017 | Evans et al. | |
| 2012/0011923 A1 | 1/2012 | Evans et al. | |
| 2012/0291561 A1 | 11/2012 | Evans et al. | |

\* cited by examiner

*Primary Examiner* — Reinaldo Sanchez-Medina
(74) *Attorney, Agent, or Firm* — Patterson + Sheridan, LLP

(57) ABSTRACT

An insertion apparatus and method is provided. In one embodiment, an insertion apparatus is disclosed having an insertion guide including an insertion guide housing having a guide passage, a guide seal packing disposed in the insertion guide, a guide flange extending outwardly from the insertion guide housing to form a guide seal surface; and a coupling nut. The coupling nut is disposed on the insertion guide housing and has a coupling nut passage. The insertion guide housing extends through the coupling nut passage. The coupling nut is configured to provide an insertion apparatus union joint where the guide seal surface is used in forming the insertion apparatus union joint.

20 Claims, 6 Drawing Sheets

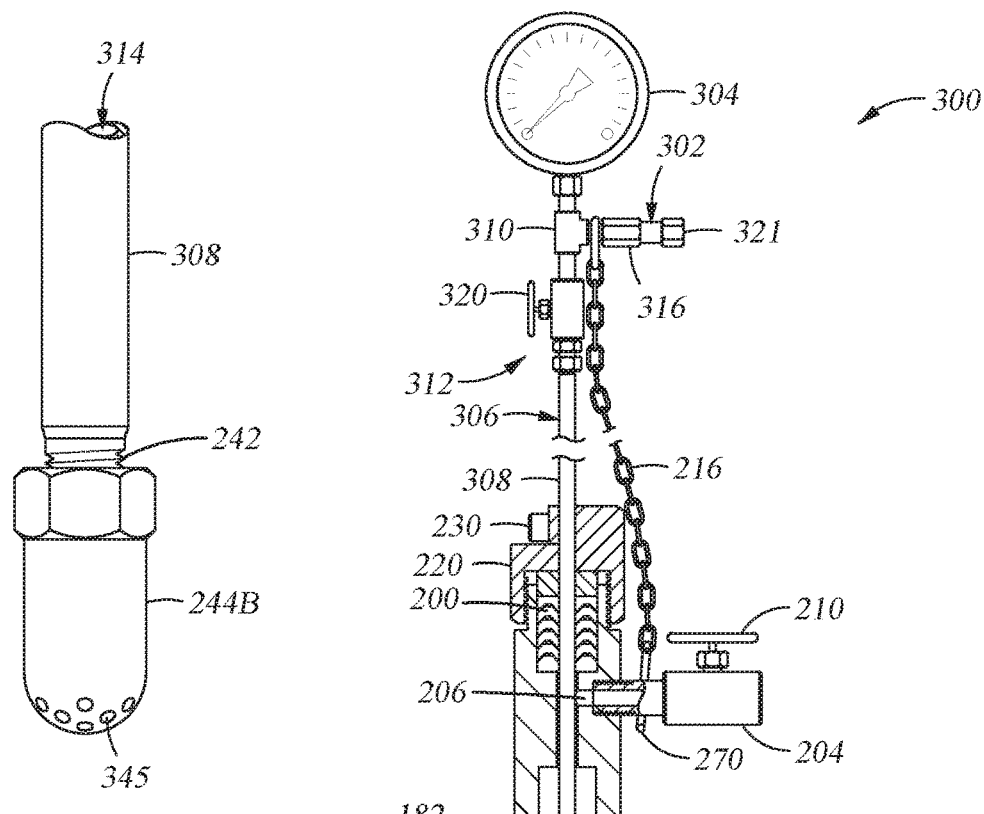
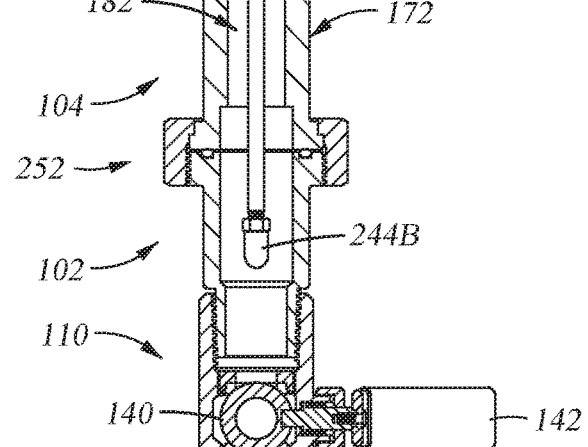
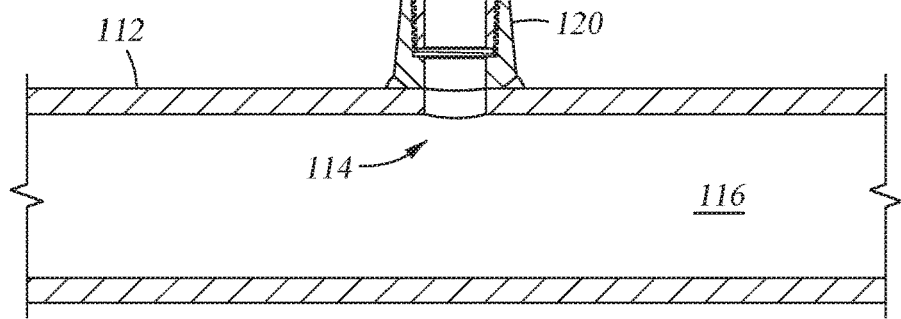
Fig. 6
Fig. 5

PIPELINE INSERTION APPARATUS AND METHOD

BACKGROUND

Field

Embodiments described herein relate generally to insertion apparatuses, and more specifically, to the field of insertion apparatuses for pressurized pipelines or vessels.

Description of the Related Art

Insertion apparatuses such as coupon holder apparatuses and atomizer apparatuses are used to insert an insert object into pressurized pipelines and vessels. For example, an insertion apparatus in the form of a coupon holder apparatus may be used to insert a test coupon into a pressurized pipeline. The test coupon may be made of metal. The test coupon may be withdrawn from the pressurized pipeline by the coupon holder apparatus. The test coupon provides a way to measure corrosion within the pressurized pipeline. The insertion apparatus may be in the form of an atomizer apparatus for injecting chemicals into a pressurized pipeline. The atomizer apparatus inserts a mist-spraying nozzle into the pressurized pipeline to atomize the fluid being injected into the pressurized pipeline.

An insertion apparatus may be connected to a pressurized pipeline by connecting the insertion apparatus to a control valve. The control valve is movable between an open position and a closed position, and one example of the control valve is a ball valve. The insertion apparatus may be installed on a pressurized pipeline in a remote field location on a temporary basis to perform operations such as testing for corrosion or adding fluid chemicals. The insertion apparatus may need to be connected and disconnected to the pressurized pipeline to perform operations at different times. The insertion apparatus is portable by a user and may be connected and disconnected to different pressurized pipelines to perform operations on the pressurized pipeline.

There is a need for an insertion apparatus and method that provides for efficient installation of the insertion apparatus, provides an insertion apparatus that is durable and allows for efficient replacement of parts that may wear through use of the insertion apparatus, and provides a design that minimizes the risk of fluid leaks when using the insertion apparatus.

SUMMARY

Embodiments of the disclosure describe an insertion apparatus including an insertion guide. In one embodiment, the insertion guide has an insertion guide housing having a guide passage, a guide seal packing disposed in the insertion guide, a guide flange extending outwardly from the insertion guide housing to form a guide seal surface, and a coupling nut. The coupling nut is disposed on the insertion guide housing and has a coupling nut passage. The insertion guide housing extends through the coupling nut passage. The insertion guide includes a connection adapter. The connection adapter includes a connection adapter housing with a connection adapter passage, an adapter flange extending outwardly from the connection adapter housing to form a connection adapter seal surface, and a first adapter connector. The first adapter is configured to connect the connection adapter to the insertion guide by connecting the coupling nut to the first adapter connector to position the guide seal surface and the connection adapter seal surface in a sealed position so as to form an insertion apparatus union joint between the insertion guide and the connection adapter. The insertion apparatus includes a rod apparatus having a rod. The rod is configured to extend through the guide passage and the connection adapter passage.

In one embodiment, a method of assembling and installing an insertion apparatus is disclosed. The method includes assembling an insertion guide. The insertion guide includes an insertion guide housing having a guide passage and a first end, a guide seal packing disposed in the insertion guide, and a guide flange extending outwardly from the insertion guide housing to form a guide seal surface. A coupling nut is disposed on the insertion guide housing and has a coupling nut passage. Assembling the insertion guide includes sliding the coupling nut over the first end and onto the insertion guide housing so that the insertion guide housing extends through the coupling nut passage and detachably connecting a bleeder valve assembly to the guide housing. The bleeder valve assembly includes a bleeder valve connector configured to detachably attach the bleeder valve assembly to the guide housing. The coupling nut is disposed on the guide housing between the guide flange and the bleeder valve assembly. The method includes inserting a rod of a rod apparatus through the guide passage and connecting a connection adapter to a pipe valve assembly. The connection adapter includes a connection adapter housing with a connection adapter passage, an adapter flange extending outwardly from the connection adapter housing to form a connection adapter seal surface, and a first adapter connector. The method includes forming an insertion apparatus union joint between the insertion guide and the connection adapter. Forming the insertion apparatus union joint includes connecting the connection adapter to the insertion guide by connecting the coupling nut to the first adapter connector to position the guide seal surface and the connection adapter seal surface in a sealed position.

In one embodiment, an insertion apparatus is disclosed having an insertion guide including an insertion guide housing having a guide passage, a guide seal packing disposed in the insertion guide, a guide flange extending outwardly from the insertion guide housing to form a guide seal surface; and a coupling nut. The coupling nut is disposed on the insertion guide housing and has a coupling nut passage. The insertion guide housing extends through the coupling nut passage. The coupling nut is configured to provide an insertion apparatus union joint where the guide seal surface is used in forming the insertion apparatus union joint.

BRIEF DESCRIPTION OF THE DRAWINGS

So that the manner in which the above recited features of the present disclosure can be understood in detail, a more particular description of the disclosure, briefly summarized above, may be had by reference to implementations, some of which are illustrated in the appended drawings. It is to be noted, however, that the appended drawings illustrate only selected implementations of this disclosure and are therefore not to be considered limiting of its scope, for the disclosure may admit to other equally effective implementations.

FIG. 5 is a cross-sectional view of the insertion apparatus having a nozzle and pressure gauge in an assembled position installed on the pipe valve assembly, according to one embodiment.

FIG. 6 is an enlarged view of a spray nozzle attached to a fluid delivery rod of the insertion apparatus, according to one embodiment.

To facilitate understanding, identical reference numerals have been used, wherever possible, to designate identical elements that are common to the Figures. Additionally, elements of one implementation may be advantageously adapted for utilization in other implementations described herein.

DETAILED DESCRIPTION

Embodiments herein generally provide an insertion apparatus that may be installed on a pipe valve assembly attached to a pipeline. The insertion apparatus is used to insert an insert object such as a test coupon or nozzle into pressurized pipelines and vessels. The insertion apparatus provides for efficient and effective installation of the insertion apparatus onto the pipe valve assembly by providing an insertion guide and connection adapter that are connectable to form an insertion apparatus union joint. The insertion apparatus union joint provides an effective seal for the insertion apparatus connected to the pipe valve assembly. The connection adapter is designed so that it can be easily replaced in the field if damaged, for example by wear and tear after repeated connections of the insertion apparatus. The life of the insertion guide, which is the more expensive component of the insertion apparatus, is extended because the insertion guide does not have to be replaced or undergo expensive repairs if the connection adapter is damaged. The insertion guide has an efficient design that is easy to install and minimizes the risk of fluid leaks as further discussed with respect to embodiments herein.

Figure 1:
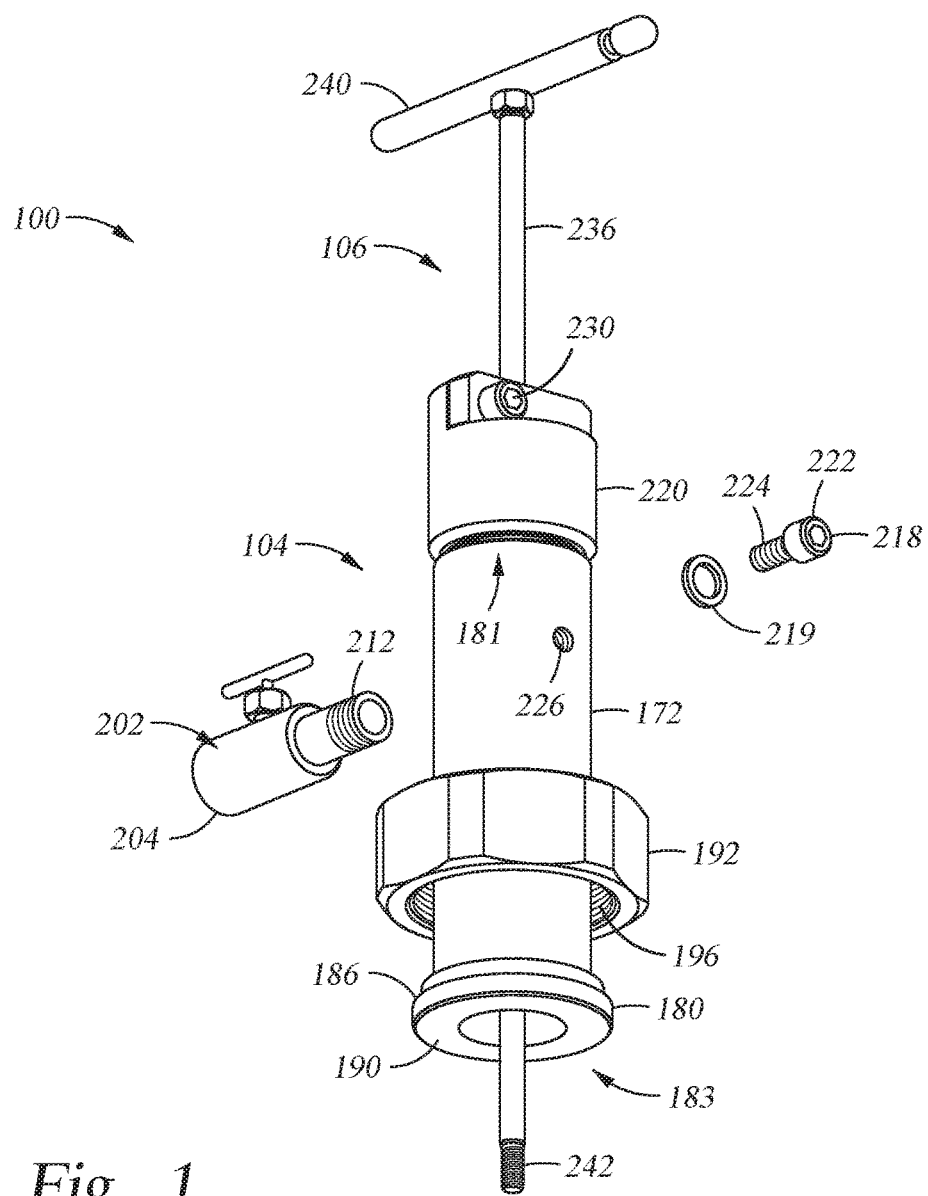
FIG. 1 is an exploded, perspective view of an insertion apparatus in an unassembled position, according to one embodiment.
Figure 1:
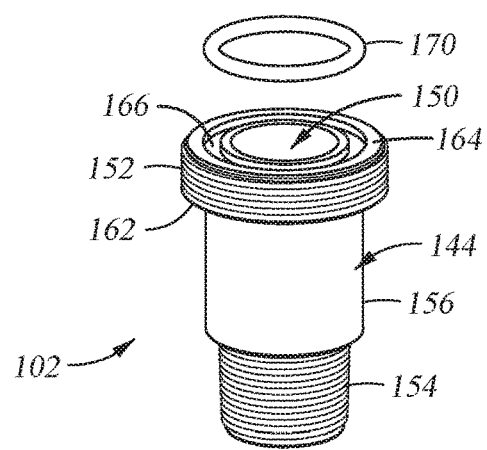
Figure 2:
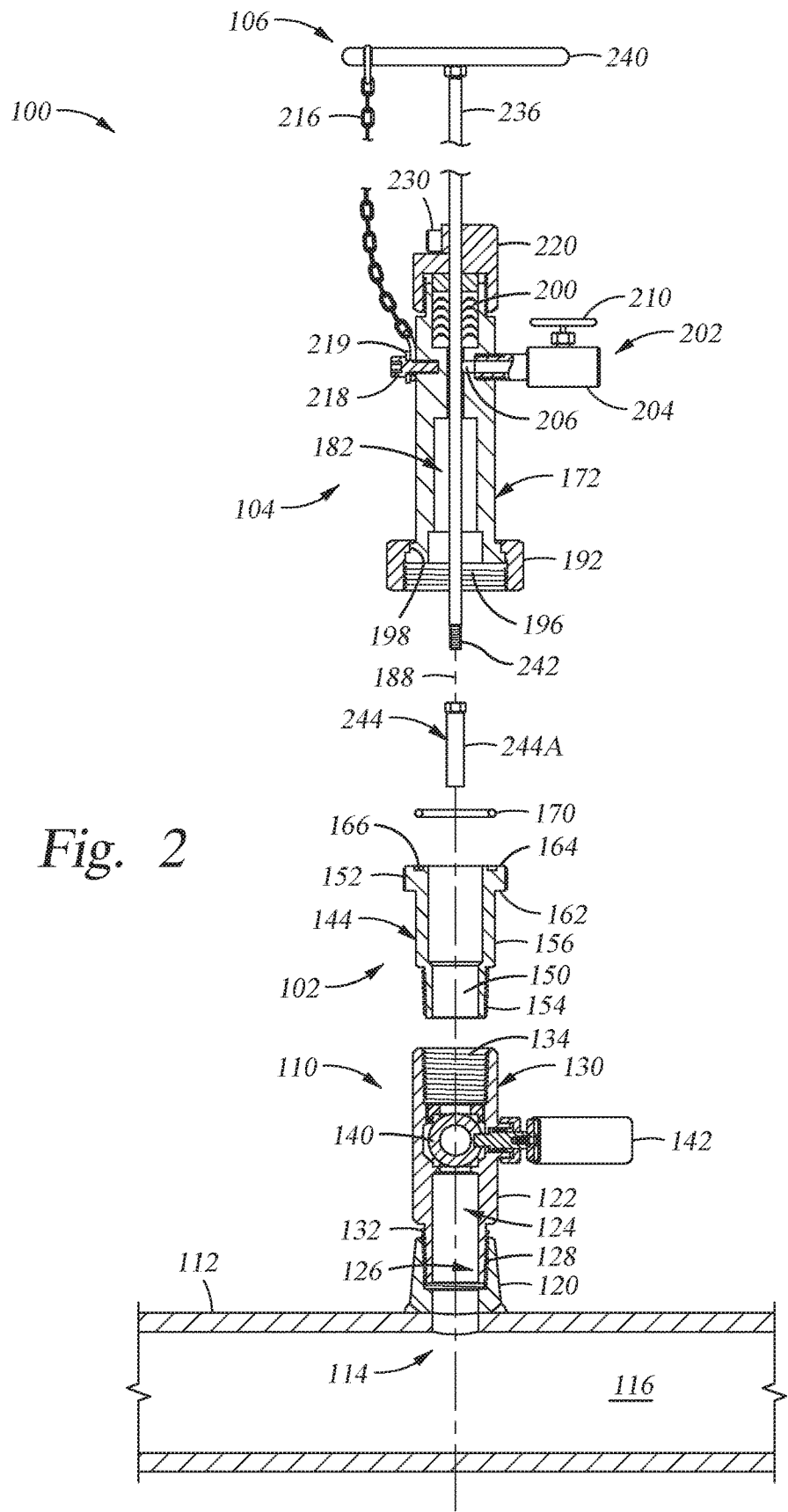
FIG. 2 is an exploded, cross-sectional view of an insertion apparatus in an unassembled position, according to one embodiment.

FIG. 1 is an exploded, perspective view of an insertion apparatus 100 in an unassembled position. The insertion apparatus 100 includes a connection adapter 102, an insertion guide 104, and a rod apparatus 106. As shown in FIG. 2, the insertion apparatus 100 is connectable to a pipe valve assembly 110. The pipe valve assembly 110 is shown connected to a pipeline 112. In some embodiments, the pipe valve assembly 110 may be connected to a vessel. The pipeline 112 has a pipe opening 114 and a pipe interior 116. The pipeline 112 has a pipe connector housing 120 that may have connector housing internal threads 128 for providing the connection with the pipe valve assembly 110. The pipe valve assembly 110 includes a pipe valve housing 122 having a pipe valve passage 124. The pipe valve passage 124 extends from a pipe valve attachment end 126 to a pipe valve distal end 130.

The pipe valve assembly 110 is connected to the pipeline 112 by threading pipe valve external threads 132 to pipe housing internal threads 128. At the other end of the pipe valve assembly 110 is a pipe valve distal end connector in the form of pipe valve internal threads 134. A pipe valve member 140 is disposed within the pipe valve housing 122, and is attached to a pipe valve handle 142. The pipe valve assembly 110 and pipe valve member 140 may be a conventional type of pipe valve assembly and pipe valve member. The pipe valve member shown in FIG. 1 is depicted as a ball valve member. The pipe valve assembly 110 is movable between an open pipe valve position where fluid is allowed to flow through the pipe valve assembly 110 and a closed pipe valve position where fluid is blocked from flowing through the pipe valve assembly 110.

Referring to FIG. 1 and FIG. 2, the connection adapter 102 detachably couples the insertion guide 104 to the pipe valve assembly 110. The connection adapter 102 has a connection adapter housing 144. The connection adapter housing 144 defines a connection adapter passage 150 extending through the connection adapter housing 144. The connection adapter 102 has a first adapter connector 152 formed by a plurality of first adapter threads disposed on one end of the connection adapter housing 144 as external threads and a second adapter connector 154 formed by a plurality of second adapter threads disposed on an opposite end of the connection adapter housing 144 as external threads. The second adapter connector 154 provides for a threaded connection with the pipe valve assembly 110. In alternative embodiments the second adapter connector 154 may be in the form of internal threads. The first adapter connector 152 provides for a threaded connection to attach insertion guide 104 to the connection adapter 102. In alternative embodiments, the first adapter connector 152 may be in the form of internal threads.

The connection adapter housing 144 includes an adapter flange 162 and a housing main section 156. The adapter flange 162 has the first adapter connector 152 formed on an outer surface. The connection adapter housing 144 may be generally cylindrical in shape. The adapter flange 162 extends outwardly from the housing main section 156. The adapter flange 162 has a connection adapter seal surface 164. An adapter seal member 170 may be disposed proximate the connection adapter seal surface 164. The adapter seal member 170 may be in the form of a washer, O-ring, or other seal member. A seal slot 166 may be formed in the connection adapter seal surface 164, and an O-ring may be disposed therein in some embodiments. An O-ring is shown in FIG. 1 and FIG. 2 for the adapter seal member 170. In some embodiments, the adapter seal member 170 may be made from conventional materials used for seals, including polyurethane and rubber.

The insertion guide 104 includes an insertion guide housing 172, a coupling nut 192, and an end cap 220. The insertion guide housing 172 defines a guide passage 182 that extends through the insertion guide housing 172 along a passage axis 188 from a first end 181 to a second end 183. The guide passage 182 includes an upper guide passage section that has a guide seal packing 200 disposed therein. The guide seal packing 200 has a seal member passage sized for the rod apparatus 106 to extend there through. The guide seal packing 200 forms a seal around the rod 236 of the rod apparatus 106. A guide flange 180 is disposed at the second end 183 of the insertion guide housing 172 and extends outwardly from the insertion guide housing 172.

The coupling nut 192 is disposed around the insertion guide housing 172 and proximate the guide flange 180. The coupling nut 192 is configured so that the insertion guide housing 172 extends through a coupling nut passage 198. The coupling nut 192 has a threaded coupling nut connector in the form of a plurality of coupling nut threads 196. The coupling nut threads 196 are internal threads. In some embodiments, the coupling nut threads 196 may be external threads.

The coupling nut 192 is slidably connected to the insertion guide housing 172 when the insertion guide 104 is in the unassembled position. The guide flange 180 is disposed at a first end of the insertion guide housing 172 and extends outwardly from the insertion guide housing 172. The guide flange 180 has a guide flange shoulder 186 that prevents the coupling nut 192 from being slid past the guide flange 180 and disconnected from the insertion guide housing 172. The coupling nut 192 is disposed at least partially above the guide flange 180 when the guide flange 180 blocks the coupling nut 192 from being disconnected from the insertion guide housing 172.

A bleeder valve assembly 202 is attached to the insertion guide housing 172, and the bleeder valve assembly 202 blocks the coupling nut 192 from being slid past the bleeder valve assembly 202 and off the first end 181 of the insertion guide housing 172. In other embodiments, a stop member may be provided so that the coupling nut 192 will not slide off of the insertion guide housing 172.

The coupling nut 192 is slidably connected to the guide housing between the guide flange 180 and the bleeder valve assembly 202 or other stop member when the insertion guide 104 is in the unassembled position. Having the coupling nut 192 slidably connected to the insertion guide housing 172 when in the unassembled position provides the benefit of the insertion apparatus 100 having fewer disconnected parts when in the unassembled position. The unitary design of the insertion guide 104 with coupling nut 192 provides for efficient assembly and installation of the insertion apparatus 100 to the pipe valve assembly 110 and pipeline 112 in a field location.

Coupled to the insertion guide housing 172 is the bleeder valve assembly 202. The bleeder valve assembly 202 is used to release pressurized fluid from the insertion guide 104 in a controlled manner where the pressurized fluid is released at a controlled rate to bring the fluid pressure in the insertion guide housing 172 to atmospheric pressure. The bleeder valve assembly 202 includes a bleeder valve housing 204. A bleeder flowpath 206 is coupled to the guide passage 182 and extends through the insertion guide housing 172 and to the guide passage 182.

The bleeder valve housing 204 has a bleeder valve connector 212 for detachably connecting the bleeder valve assembly 202 to the insertion guide housing 172. The bleeder valve connector 212 includes external threads, as shown in FIG. 1 and FIG. 2. The bleeder valve assembly 202 may be coupled to the insertion guide housing 172 using threaded connections. Other detachable connectors may be used for the bleeder valve connector 212.

In other embodiments, the bleeder valve assembly 202 is integrally attached to the insertion guide housing 172 by either welding the bleeder valve housing 204 to the insertion guide housing 172 or forming the insertion guide housing 172 and at least a portion of the bleeder valve housing 204 as a unitary member during a manufacturing process. Integrally attaching the bleeder valve assembly 202 to the insertion guide housing 172 does not include attachment means that use threaded connections.

A bleeder valve handle 210 may be connected to the bleeder valve assembly 202 to position the bleeder valve assembly 202 from a closed position blocking flow of pressurized fluid from the guide passage 182 and bleeder flowpath 206 to an open position allowing a low flow rate from the guide passage 182 and bleeder flow path and through the bleeder valve assembly 202.

The rod apparatus 106 includes a rod 236 that is elongated. The rod 236 extends through the end cap 220 and the guide passage 182 of the insertion guide housing 172. The end cap 220 may be in the form of a packer nut. The rod 236 may be cylindrical in shape and extends along the passage axis 188. The rod 236 has a rod handle 240 attached to one end and a rod insert holder 242 attached to an opposite end. The rod insert holder 242 attaches an insert 244. As shown in FIGS. 1-2, the insert 244 is a test coupon 244A that is held by the rod insert holder 242. The rod insert holder 242 may be a threaded connection used to attach the insert 244 to the rod 236. The rod insert holder 242 may use other connectors to connect the insert 244.

The rod apparatus 106 may be connected to the insertion guide 104 by a safety link 216 that is coupled to the rod apparatus 106 and the insertion guide housing 172. The safety link 216 may be in the form of a chain. A safety link connector 218 is detachably connectable to the insertion guide housing 172 to connect one end of the safety link 216 to the insertion guide housing 172. The safety link connector 218 is shown in the form of a bolt. A washer 219 may be used with the bolt to secure the safety link 216 to the insertion guide housing 172. Other types of safety link connectors including snap-on connectors, adhesive connectors, and other connectors may be used in alternative embodiments. The safety link connector 218, shown in FIGS. 1-4, includes a bolt head 222 and a threaded shaft 224 having external threads. The safety link connector 218 connects to the insertion guide housing 172 when the threaded shaft is threaded into a connector passage 226 disposed in the insertion guide housing 172. The connector passage 226 includes connector threads. The connector threads are internal thread disposed in the connector passage 226. The safety link connector 218 may be inserted through a link of the safety link 216 and then threaded into the connector passage 226 to secure the link between the safety link connector 218 and the insertion guide housing 172. In other embodiments, the safety link connector 270 may extend through a coupling link 217 that couples to the safety link 216, as shown in FIG. 4.

A safety link connector 270 of a different embodiment is shown in FIG. 5. The safety link connector 270 is in the form of a link that is connectable to the bleeder valve assembly 202. More specifically, the safety link connector 270 is secured around the bleeder valve housing 204. The safety link connector 270 may be connected to the insertion guide housing 172 by inserting the bleeder valve housing 204 through the safety link connector 270 and connecting the bleeder valve assembly 202 to the insertion guide housing 172. In alternative embodiments, an attachment member may be connected to the bleeder valve housing 204 and the safety link connector 270 may be detachably connected to the attachment member. In some embodiments, the safety link connector 270 may be a link of the safety link 216. In other embodiments, the safety link connector 270 may extend through a link of the safety link 216.

The end cap 220 has an end cap housing having an end cap passage that extends therethrough. The end cap 220 may include a set member 230. The set member 230 may be in the form of a set screw. The set member 230 may be threaded into internal threads in a screw passage. The set member 230 is used to secure the rod apparatus 106 in place within the insertion guide housing 172 to prevent axial and rotational movement of the rod apparatus 106 with respect to the insertion guide housing 172. In some embodiments, a split collet may be disposed in the end cap passage so that the collet extends around the rod apparatus 106. The collet tightens when the set member 230 is threaded into the screw passage so that an end of the set member 230 presses against the collet. The end of the set member 230 presses against the collet causing the collet to clamp against the rod apparatus 106 so that the rod apparatus 106 is clamped within the end cap 220 of the insertion guide 104.

Figure 3:
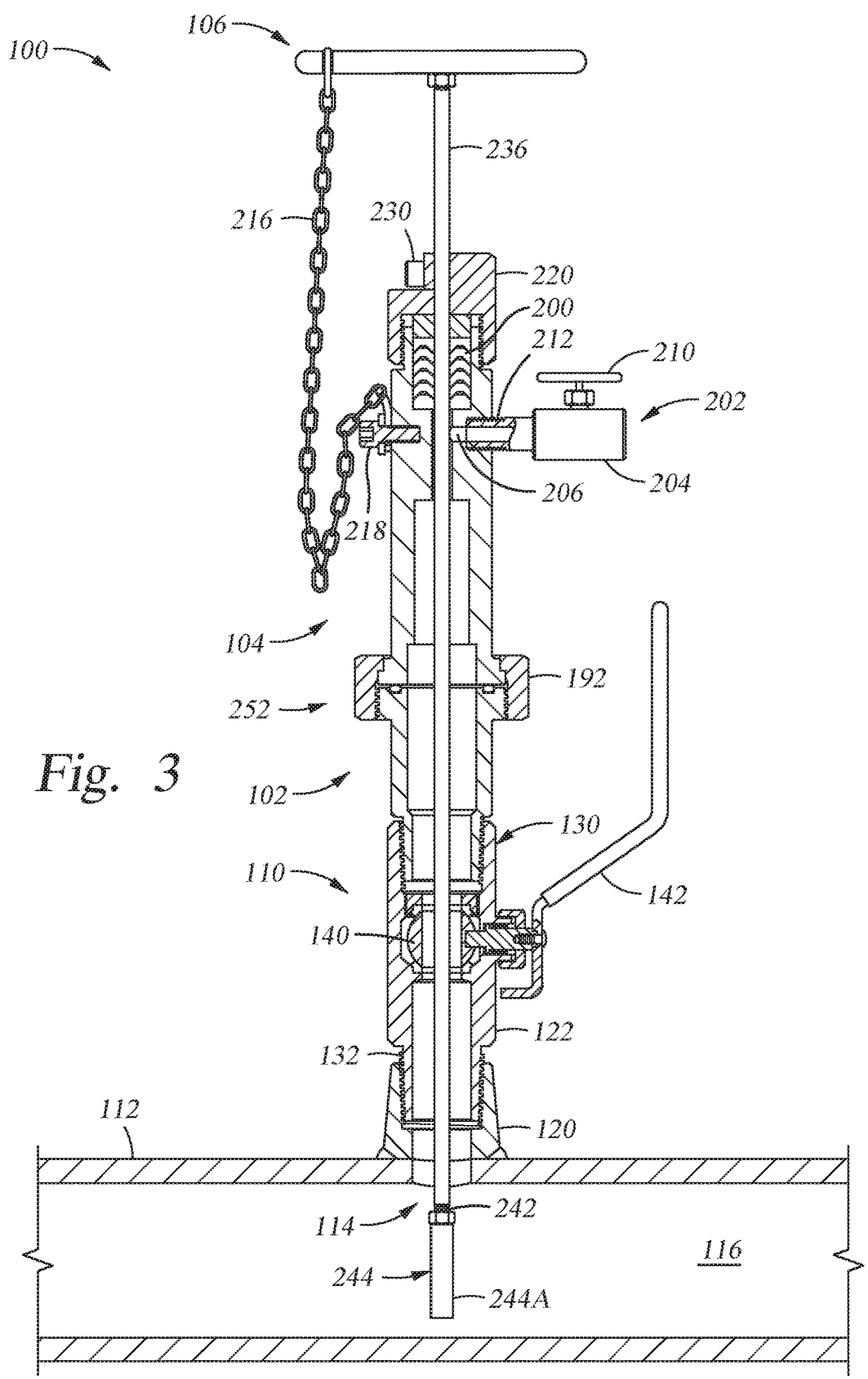
FIG. 3 is a cross-sectional view of the insertion apparatus in an assembled position installed on a pipe valve assembly, according to one embodiment.
Figure 4:
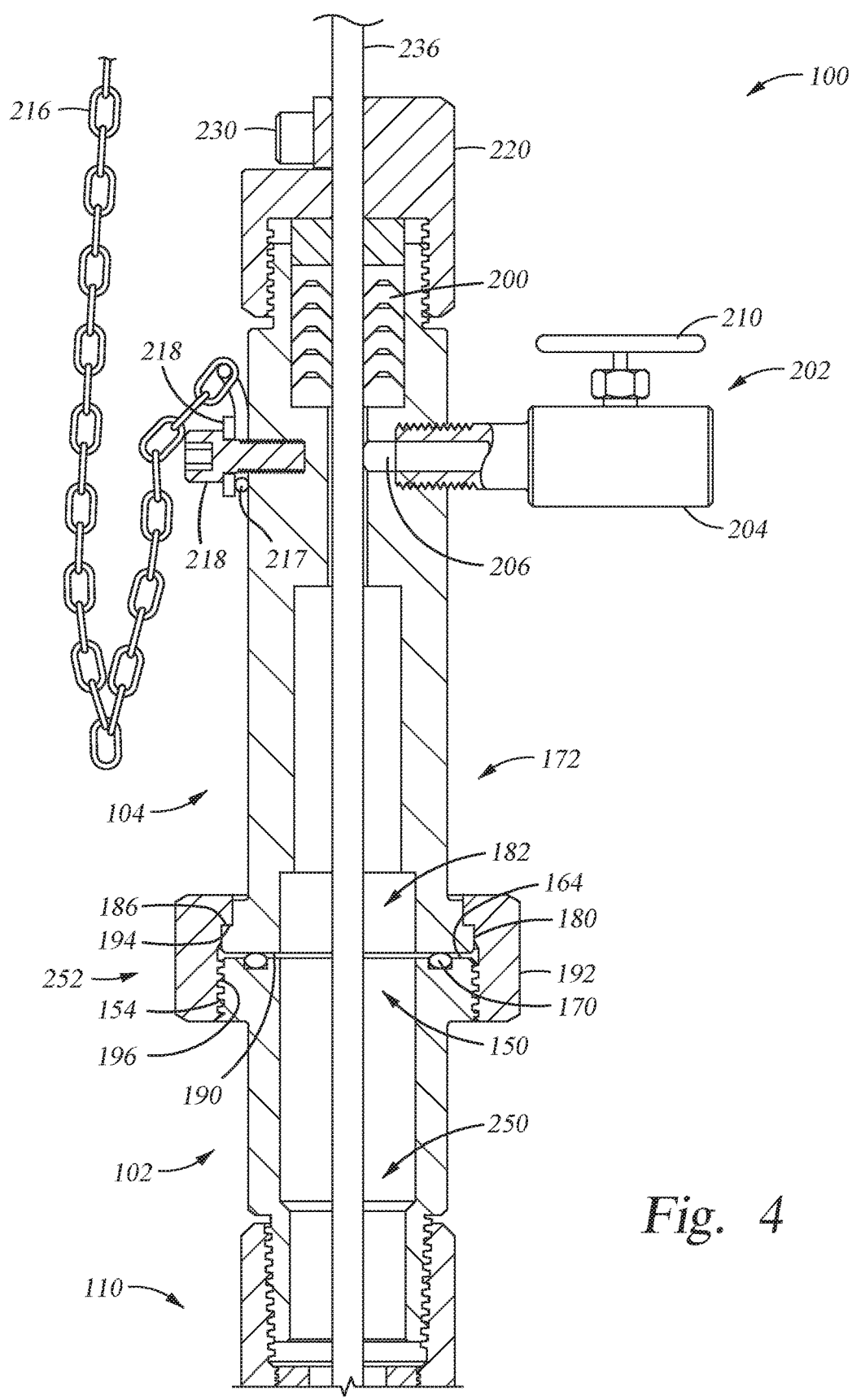
FIG. 4 is a partial view of the insertion apparatus in an assembled position installed on the pipe valve assembly showing an enlarged view of an insertion guide attached to a connection adapter, according to one embodiment.

Referring to FIG. 3 and FIG. 4, the insertion apparatus 100 is shown in an assembled position installed on the pipe valve assembly 110. FIG. 4 is a partial view of the insertion apparatus 100 in an assembled position installed on the pipe valve assembly 110 showing an enlarged view of the insertion guide 104 attached to the connection adapter 102. The insertion guide 104 is positionable between an assembled position, shown in FIG. 3 and FIG. 4, where the insertion guide 104 is connected to the connection adapter 102 and an unassembled position, shown in FIG. 1 and FIG. 2, where the insertion guide 104 is disconnected from the connection adapter 102. The guide flange 180 is disposed at a first end of the insertion guide housing 172 and extends outwardly from the insertion guide housing 172, as shown in the enlarged view of FIG. 4. The guide flange 180 has a guide flange shoulder 186 and the coupling nut 192 has a coupling nut shoulder 194 that are configured to be positioned adjacent one another when the insertion apparatus 100 is in the assembled position.

The insertion apparatus 100 is installed on the pipe valve assembly 110 by connection adapter 102, and the pipe valve assembly 110 is attached to the pipeline 112. An insertion apparatus passage 250 extends through the insertion apparatus 100 along a passage axis 188, and includes the connection adapter passage 150 and guide passage 182. The insertion apparatus passage 250 is sized to allow the rod 236 to move within insertion apparatus passage 250 as the insertion guide housing 172 and connection adapter 102 remain stationary.

As shown in FIG. 3, the insertion apparatus 100 may be positioned in an operational position where the rod apparatus 106 has been slid within the insertion guide 104 so that the rod insert holder 242 at the end of the rod 236 extends through the connection adapter 102. When the insertion apparatus 100 is in the operational position and installed on the pipe valve assembly 110, the rod insert holder 242 and attached test coupon 244A is disposed within the pipe interior 116, as shown in FIG. 2. In the operational position shown in FIG. 2, the pipe valve assembly 110 is in the pipe valve open position. When in the pipe valve open position, the pipe valve assembly 110 allows pressurized fluid to flow from pipeline 112, through the pipe valve assembly 110, and into the insertion apparatus 100.

The insertion apparatus 100 is configured to seal the pressurized fluid from the pipeline 112 in the insertion apparatus 100 when in the operational position. Sealing the pressurized fluid from the pipeline 112 is important to prevent unintentional release of fluid from the pipeline 112. The insertion apparatus 100 may be designed to operate for pipelines 112 having a range of fluid pressures. For example, in some embodiments the insertion apparatus 100 may have a pressure rating for use on the pipeline 112 having a fluid under pressure up to 1000 psi. In other embodiments, the insertion apparatus 100 may have a pressure rating for use on the pipeline 112 having fluid under pressure up to 150 psi. In other embodiments, the insertion apparatus may have a pressure rating for fluid under pressure in excess of 1000 psi. The connection between the insertion guide 104 and the connection adapter 102 need to provide a seal to prevent leakage of fluid when the insertion apparatus 100 is in the operational position and exposed to pressurized fluid from the pipeline 112.

The insertion apparatus 100 has an insertion apparatus union joint 252 that is configured to provide a sealed connection between the insertion apparatus 100 and the pipe valve assembly 110. The insertion apparatus union joint 252 is formed between the insertion guide 104 and the connection adapter 102. The insertion apparatus union joint 252 includes the guide seal surface 190 of the insertion guide housing 172 and the connection adapter seal surface 164 of the connection adapter 102 that are disposed opposite one another.

Referring to FIG. 4, the insertion apparatus union joint 252 is formed by connecting the connection adapter 102 to the insertion guide 104 by connecting the coupling nut 192 to the first adapter connector 152 to position the guide seal surface 190 and the connection adapter seal surface 164 in a sealed position. The coupling nut 192 is threaded onto the connection adapter 102 to force the coupling nut shoulder 194 against the guide flange shoulder 186 of the guide flange 180 so as to force the insertion guide housing 172 and connection adapter 102 towards one another. The guide seal surface 190 and the connection adapter seal surface 164 are forced together by the coupling nut shoulder 194 applying force to the guide flange shoulder 186 as the external threads of the first adapter connector 152 is connected with the coupling nut threads 196.

The guide seal surface 190 and the connection adapter seal surface 164 are compressed together to form a seal at the connection between the insertion apparatus 100 and the connection adapter 102. An adapter seal member 170 may be disposed between the guide seal surface 190 and the connection adapter seal surface 164. The insertion apparatus union joint 252 provides an effective seal that provides ease of installation for the installer attaching the insertion apparatus 100 onto the pipe valve assembly 110. The installer may attach the insertion apparatus 100 to the connection adapter 102 by simply rotating the coupling nut 192 to thread the coupling nut 192 onto the connection adapter 102.

Another seal is provided in the insertion apparatus passage 250 to contain pressurized fluid in the insertion apparatus 100 when the insertion apparatus is installed on the pipe valve assembly 110 and exposed to pressurized fluid from the pipeline 112. When the insertion apparatus 100 is in the operational position, the guide seal packing 200 in the insertion guide housing 172 provides a seal around the rod 236 to block fluid flow through the insertion apparatus passage 250. When the insertion apparatus 100 is in the operational position, the set member 230 may be positioned to lock the rod 236 in place to prevent axial and rotational movement of the rod 236 within the insertion guide 104.

FIG. 5 is a cross-sectional view of another embodiment of the insertion apparatus 300 for injecting fluid into the pipe interior 116 of pipeline 112. The insertion apparatus 300 may be referred to as an atomizer. The insertion apparatus 300 is similar to the insertion apparatus 100 but is configured to inject a fluid into the pipe interior 116. The insertion apparatus 300 may have embodiments with different pressure ratings, as discussed with respect to insertion apparatus 100. The insertion apparatus 300 includes a fluid source apparatus 302, a pressure gauge 304, and a fluid delivery rod apparatus 306 having a fluid delivery rod 308.

The fluid source apparatus 302 is connected to the fluid delivery rod 308 to supply an injection fluid through the fluid delivery rod 308 and to the pipe interior 116. The fluid source apparatus 302 includes a fluid delivery housing 310 that is connected at one end to the pressure gauge 304 and at an opposite end to a control valve apparatus 312. A chemical injection housing 316 is connected to the fluid delivery housing 310.

Referring to FIG. 5 and FIG. 6, a rod internal flowpath 314 extends through the fluid delivery rod 308 from the rod insert holder 242 to the control valve apparatus 312. The fluid delivery rod 308 has an elongated shape and extends through the insertion guide 104. The fluid delivery rod 308 has a rod nozzle 244B attached to the rod insert holder 242. The rod nozzle 244B has a plurality of nozzle openings 345 for producing a fluid spray from the rod nozzle 244B for fluid flowing to the rod nozzle 244B. The spray nozzle 244B has nozzle openings 345 that provide for fluid to be injected into pipe interior 116 in a spray or mist. The spray nozzle 244B may be configured to atomize the fluid being injected into the pipe interior 116.

The fluid source apparatus 302 has a connection end 321 that may be connected to a fluid source for providing chemicals to be injected into the pipe interior 116. The control valve apparatus 312 includes a control valve handle 320 for positioning the control valve apparatus 312 between a closed position, where fluid is blocked from flowing through the fluid delivery housing 310 to the fluid delivery rod 308, and an open position, where fluid flow is allowed through the fluid delivery housing 310 to the fluid delivery rod 308.

Figure 7:
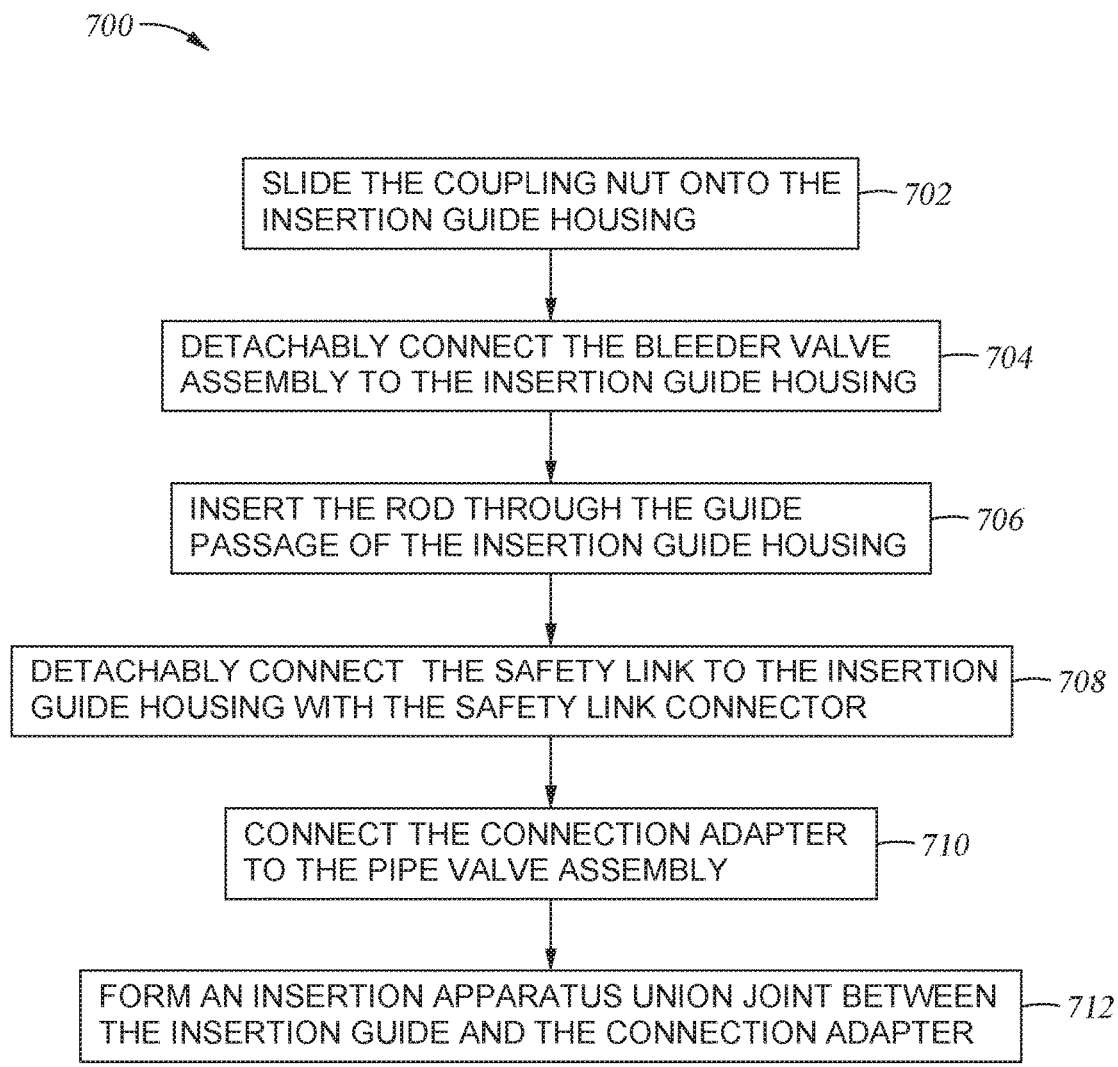
FIG. 7 is a flow chart depicting the assembly and installation of the insertion apparatus.

In operation, the insertion apparatus 100, 300 is configured to be efficiently assembled and installed at a field location. An embodiment of an assembling and installing process 700 for insertion apparatus 100, 300 is depicted in the flow chart of FIG. 7. Referring to FIG. 7, the insertion apparatus 100, 300 may be assembled by sliding the coupling nut 192 onto the insertion guide housing 172 at block 702 by sliding the coupling nut 192 over the first end 181 of the insertion guide housing 172. After the coupling nut 192 has been slid on the insertion guide housing 172, the bleeder valve assembly 202 is detachably connected to the insertion guide housing 172 at block 704. The rod 236, 308 is inserted through the guide passage 182 of the insertion guide housing 172 at block 706. The end cap 220 may be threaded onto the insertion guide housing 172. The safety link 216 is detachably connected onto the insertion guide housing 172 with the safety link connector 218 at block 708.

The insertion apparatus 100, 300 that has been assembled is installed at a field location by connecting the connection adapter 102 to the pipe valve assembly 110 at block 710. The pipe valve assembly 110 is connected to the pipeline 112. The insertion apparatus 100, 300 is a hand-held device that may be carried to a location where the pipe valve assembly 110 is attached to the pipeline 112. The connection adapter 102 is attached to the pipe valve assembly 110 by attaching the external threads of the second adapter connector 154 to the pipe valve internal threads 134 to form a threaded connection.

After the connection adapter 102 is connected to the pipe valve assembly 110, the insertion guide 104 may be connected to the pipeline 112 using the connection adapter 102 to form an insertion apparatus union joint 252 at block 712. A union joint seal is formed between the insertion guide 104 and the connection adapter 102. The insertion guide 104 is positioned with respect to the connection adapter 102 so that the guide seal surface 190 of the insertion guide 104 is proximate the connection adapter seal surface 164 of the connection adapter 102. The coupling nut 192 disposed on the insertion guide 104 is used to connect the insertion guide 104 to the connection adapter 102. The coupling nut 192 is rotated so that the coupling nut threads 196 connect with the external threads of the first adapter connector 152 to form a threaded connection. Attaching the coupling nut 192 to the connection adapter 102 forces the guide seal surface 190 of the insertion guide and the connection adapter seal surface 164 of the connection adapter 102 together to form a seal at the insertion apparatus union joint 252. The adapter seal member 170 may be located between the guide seal surface 190 and the connection adapter seal surface 164. The seal at the insertion apparatus union joint 252 surrounds the insertion apparatus passage 250 extending therethrough. More specifically, the guide seal surface 190 of the insertion guide 104 and the connection adapter seal surface 164 of the connection adapter 102 surround the insertion apparatus passage 250.

The combination of the connection adapter 102 and the insertion apparatus union joint 252 allow the insertion apparatus 100, 300 to be efficiently installed on the pipe valve assembly 110 and to be repairable at the field location where the insertion apparatus 100, 300 is used. The insertion apparatus 100, 300 may need to be repeatedly connected and disconnected from the pipe valve assembly 110. The insertion apparatus union joint 252 allows the insertion guide to be connected to the pipe valve assembly 110 using the insertion apparatus union joint 252 and has the benefit of providing a seal that is not a threaded seal. A threaded seal may become damaged as threads may become worn after repeated connections and disconnections.

The insertion apparatus 100, 300 is configured to be efficiently repairable at the field location. The insertion apparatus 100, 300 is configured so that the connection adapter 102 is replaceable at the field location. This provides the benefit that the insertion apparatus 100, 300 does not need to be replaced due to wear on the connection between the insertion guide 104 and the pipe valve assembly 110. For example, if the external threads of the first adapter connector 152 or the external threads of the second adapter connector 154 become worn, the connection adapter 102 may be replaced at the field location.

In addition, the coupling nut 192 may be replaced at the field location. The coupling nut 192 may be detached from the insertion guide housing 172. The coupling nut 192 may be detached by reversing the assembly and installation process described with respect to FIG. 6. After closing the pipe valve assembly 110 and bleeding pressure from the insertion apparatus 100, 300, the insertion apparatus union joint 252 is disconnected by rotating the coupling nut 192 and the insertion guide 104 is removed from the connection adapter 102. The safety link 216 is disconnected from the guide housing 172 by disconnecting the safety link connector 218, 270. The safety link connector 218, shown in FIG. 1, may be unthreaded from the insertion guide housing 172. The bleeder valve assembly 202 is then disconnected by unthreading the bleeder valve housing 204 from the insertion guide housing 172. End cap 220 may be unthreaded from the insertion guide housing 172, after the set member 230 has been loosened. The rod 236, 308 is removed from the insertion guide housing 172.

The coupling nut 192 is then slid off the insertion guide housing 172 by sliding the coupling nut 192 along the insertion guide housing 172 from the guide flange 180, past the bleeder flowpath 206, past the connector passage 226, and off the first end 181 of the insertion guide housing 172 opposite the guide flange 180. The disconnected coupling nut 192 may be replaced by another coupling nut 192 that is new or undamaged. The replacement coupling nut 192 may be used when assembling the insertion apparatus 100, 300, as shown in FIG. 7.

Replacement of a worn or damaged coupling nut 192 or connection adapter 102 avoids having to replace the more expensive insertion guide 104 or make substantial repairs to the insertion guide 104. Instead a comparatively less expensive component in the form of the coupling nut 192 or connection adapter 102 may be replaced due to the slidable connection of the coupling nut 192, while other components of the insertion guide 104, including the insertion guide housing 172 do not need to be replaced.

Once installed, the insertion apparatus 100, 300 operates as follows. The pipe valve assembly 110 is initially in a valve closed position. The insertion guide 104 is in a non-operational position where the rod apparatus 106 is not inserted in the pipe interior 116. As shown in FIG. 5, the insert 244 is disposed above the pipe valve member 140 that is positioned to block fluid flow from the pipeline 112. To place the insertion apparatus 100, 300 in an operational position, a user uses the pipe valve handle 142 to move the pipe valve assembly 110 to the open valve position. Pressurized fluid from the pipeline 112 is in fluid communication with the insertion apparatus passage 250. The insertion apparatus union joint 252 provides a seal that prevents the pressurized fluid from leaking at the connection between the insertion guide 104 and the connection adapter 102. In addition, the guide seal packing 200 seals against the rod 236, 308 to block pressurized fluid from the pipeline 112 in the insertion apparatus passage 250 from flowing past the guide seal packing 200.

A user may slidably move the rod 236, 308 through the insertion apparatus passage 250 to move the insert 244 through the pipe valve assembly 110 and into the pipe interior 116, as shown in FIG. 3. The set member 230 may be adjusted to secure the rod 236, 308 into the operational position and to prevent the pressurized fluid from forcing the rod 236, 308 to move axially away from the pipeline 112 or rotationally with respect to the insertion guide 104 that is connected to the pipeline 112 via the connection adapter 102 and pipe valve assembly 110. In the operational position, the insert 244 of the rod 236 is disposed in the pipe interior 116.

In FIG. 3, the insertion apparatus 100 is in the form of a test coupon holder apparatus for inserting the test coupon 244A in the pipe interior 116. In FIG. 5, the insertion apparatus is in the form of an atomizer apparatus for spraying chemicals into the pipe interior 116 through a spray nozzle 244B.

After an operation has been performed by the insertion apparatus 100, 300, the insertion apparatus 100, 300 may be moved to a non-operational position by withdrawing the rod 236, 308 from the pipe interior 116 and above the pipe valve member 140. The pipe valve member 140 of the pipe valve assembly 110 may then be positioned to the pipe valve closed position.

The insertion apparatus 100, 300 is configured to perform the operation of moving the rod 236, 308 within the insertion guide housing 172 along the insertion apparatus passage 250 between a non-operational position where the rod end of the rod apparatus 106, 306 is positioned in a first position along a passage axis 188 and an operational position where the rod end is positioned in a second position along the passage axis, wherein the rod 236, 308 extends through the guide seal packing 200 disposed in the guide housing 172 when in the non-operational position and the operational position, and wherein the guide seal packing 200 forms a pressure seal around the rod 236, 308.

The bleeder valve assembly 202 may then be used to reduce the fluid pressure in the insertion apparatus 100. The bleeder valve handle 210 is used to position the bleeder valve assembly 202 to an open bleeder valve position where fluid pressure from the insertion apparatus passage 250 is slowly released. The fluid pressure from the insertion apparatus passage 250 may be released until the fluid pressure in the insertion apparatus passage 250 is at atmospheric pressure, and then the bleeder valve assembly 202 may be moved to a closed bleeder valve position. The release of fluid pressure may be performed in a conventional manner.

The insertion apparatus 100, 300 may then be disconnected from the pipe valve assembly 110 and pipeline 112 to an uninstalled position in a manner similar to the connection of the insertion apparatus 100, 300 to the installed position. For example, the coupling nut 192 may be rotated to disconnect the threaded connection between the insertion guide 104 and the connection adapter 102. The insertion guide 104 may then be removed away from the connection adapter 102 that is attached to the pipe valve assembly 110. In this manner, the insertion apparatus union joint 252 is disconnected so that the connection adapter seal surface 164 and the guide seal surface 190 are no longer in a sealed position.

In some embodiments, the connection adapter 102 is disconnected from the pipe valve assembly 110. The connection adapter 102 is disconnected by rotating the connection adapter 102 to unthread the external threads of the first adapter connector 152 from the mating threads of the pipe valve assembly 110. In other embodiments, the connection adapter 102 may be left connected to the pipe valve assembly 110 to eliminate the need to perform the process of connecting the connection adapter 102 to the pipe valve assembly for a subsequent, repeat installation of the insertion guide 104 to the pipe valve assembly 110 and pipeline 112 at a later time.

Installing and uninstalling the insertion apparatus 100, 300 is efficient and saves valuable time. Repeated installations of the insertion apparatus 100, 300 to the pipe valve assembly 110 may be made where an effective seal is provided between the insertion guide 104 and the connection adapter 102.

While the foregoing is directed to embodiments of the present disclosure, other and further embodiments of the disclosure may be devised without departing from the basic scope thereof, and the scope thereof is determined by the claims that follow.

The invention claimed is:

1. An insertion apparatus comprising:
   an insertion guide comprising:
      an insertion guide housing having a guide passage;
      a guide seal packing disposed in the insertion guide;
      a guide flange extending outwardly from the insertion guide housing to form a guide seal surface; and
      a coupling nut disposed on the insertion guide housing and having a coupling nut passage, wherein the insertion guide housing extends through the coupling nut passage;
   a rod apparatus having a rod;
   a connection adapter comprising:
      a connection adapter housing with a connection adapter passage, the connection adapter housing having an inner diameter greater than an outer diameter of the rod to allow a terminal end of the rod to pass therethrough;
      an adapter flange extending outwardly from the connection adapter housing to form a connection adapter seal surface; and
      a first adapter connector configured to connect the connection adapter to the insertion guide by connecting the coupling nut to the first adapter connector to position the guide seal surface and the connection adapter seal surface in a sealed position so as to form an insertion apparatus union joint between the insertion guide and the connection adapter.

2. The insertion apparatus of claim 1, wherein the coupling nut has a coupling nut shoulder and a plurality of coupling nut threads, wherein the guide flange has a guide flange shoulder, wherein the first adapter connector has a plurality of first adapter threads, and wherein the guide seal surface and the connection adapter seal surface are forced together by the coupling nut shoulder applying force to the guide flange shoulder as the first adapter connector is connected with the plurality of coupling nut threads.

3. The insertion apparatus of claim 2, wherein the connection adapter further comprises a second adapter connector having a plurality of second adapter threads for connecting the connection adapter to a pipe valve assembly.

4. The insertion apparatus of claim 1, wherein the insertion guide is positionable between an assembled position where the insertion guide is connected to the connection adapter and an unassembled position where the insertion guide is disconnected from the connection adapter, and wherein the coupling nut is slidably connected to the insertion guide housing.

5. The insertion apparatus of claim 4, wherein the coupling nut is configured to be connected to the insertion guide housing where the guide flange blocks the coupling nut from sliding past the guide flange, and wherein the guide passage extends along a passage axis and through the coupling nut when the insertion guide is in the unassembled position.

6. The insertion apparatus of claim 4, wherein the insertion guide is positioned from the assembled position to the unassembled position via disengagement of the coupling nut.

7. The insertion apparatus of claim 1, wherein the connection adapter further comprises an adapter flange extending outwardly from the connection adapter housing, wherein an insertion apparatus passage extends through the insertion guide housing and the connection adapter and includes the guide passage and the connection adapter passage, wherein the connection adapter seal surface is formed on the adapter flange, and wherein the guide seal surface of the insertion guide and the connection adapter seal surface of the connection adapter surround the insertion apparatus passage.

8. The insertion apparatus of claim 7, wherein the connection adapter further comprises a second adapter connector having a plurality of threads for connecting the connection adapter to a pipe valve assembly, and wherein the plurality of threads is disposed on the adapter flange.

9. The insertion apparatus of claim 1, wherein the insertion guide further comprises:
a bleeder flowpath in fluid communication with the guide passage and extending through the insertion guide housing;
a bleeder valve assembly connected to the insertion guide housing and in fluid communication with the bleeder flowpath, wherein the bleeder valve assembly is detachably connected to the insertion guide housing.

10. The insertion apparatus of claim 9, wherein the coupling nut is configured to be connected to the insertion guide housing between the guide flange and the bleeder valve assembly, and wherein the bleeder valve assembly is detachable from the insertion guide housing so that the coupling nut is slidable from the guide flange and past the bleeder flowpath in the insertion guide housing.

11. The insertion apparatus of claim 10, further comprising:
a safety link coupled between the insertion guide housing and the rod apparatus;
a safety link connector connecting the safety link to the insertion guide housing; and
wherein the safety link connector is detachably connected to the insertion guide housing at a safety link connection, wherein the safety link connector is detachable from the insertion guide housing so that the coupling nut is slidable from the guide flange and past the safety link connection on the insertion guide housing.

12. The insertion apparatus of claim 1, wherein the rod has a rod internal flowpath, and wherein the rod apparatus has a rod nozzle attached to the rod for producing a fluid spray from the rod nozzle for fluid flowing through the rod internal flowpath.

13. The insertion apparatus of claim 1, wherein the rod further comprises a rod insert holder attached to an end of the rod.

14. The insertion apparatus of claim 1, wherein the guide seal surface includes a seal slot, and wherein the insertion apparatus union joint includes an adapter seal member disposed in the seal slot.

15. A method of assembling and installing an insertion apparatus comprising:
assembling an insertion guide, wherein the insertion guide comprises:
an insertion guide housing having a guide passage and a first end;
a guide seal packing disposed in the insertion guide;
a guide flange extending outwardly from the insertion guide housing to form a guide seal surface;
a coupling nut disposed on the insertion guide housing and having a coupling nut passage;
wherein the assembling the insertion guide comprises:
sliding the coupling nut over the first end and onto the insertion guide housing so that the insertion guide housing extends through the coupling nut passage;
detachably connecting a bleeder valve assembly to the insertion guide housing, wherein the bleeder valve assembly comprises a bleeder valve connector configured to detachably attach the bleeder valve assembly to the insertion guide housing, wherein the coupling nut is disposed on the insertion guide housing between the guide flange and the bleeder valve assembly;
inserting a rod of a rod apparatus through the guide passage;
connecting a connection adapter to a pipe valve assembly, wherein the connection adapter comprises:
a connection adapter housing with a connection adapter passage, the connection adapter housing having an inner diameter greater than an outer diameter of the rod to allow a terminal end of the rod to pass therethrough;
an adapter flange extending outwardly from the connection adapter housing to form a connection adapter seal surface; and
a first adapter connector; and
forming an insertion apparatus union joint between the insertion guide and the connection adapter, wherein forming the insertion apparatus union joint comprises:
connecting the connection adapter to the insertion guide by connecting the coupling nut to the first adapter connector to position the guide seal surface and the connection adapter seal surface in a sealed position.

16. The method of claim 15, wherein the coupling nut has a coupling nut shoulder and a plurality of coupling nut threads, wherein the guide flange has a guide flange shoulder, and wherein forming the insertion apparatus union joint between the insertion guide and the connection adapter comprises:
connecting the coupling nut of the insertion guide to move a coupling nut shoulder against a guide flange shoulder to force the guide seal surface and the connection adapter seal surface together to form a union joint seal as the first adapter connector is connected with the plurality of coupling nut threads.

17. The method of claim 15, further comprising:
after sliding the coupling nut over the first end and onto the insertion guide housing, detachably connecting a safety link connector onto the insertion guide housing, wherein the safety link connector is detachably connected to the insertion guide housing; and
coupling a safety link between the insertion guide housing and the rod apparatus, and wherein the safety link is attached to the insertion guide housing by the safety link connector.

18. An insertion apparatus comprising:
an insertion guide comprising:
an insertion guide housing having a guide passage;
a guide flange extending outwardly from the insertion guide housing; and
a coupling nut disposed on the insertion guide housing and having a coupling nut passage, wherein the insertion guide housing extends through the coupling nut passage, and wherein the coupling nut is configured to provide an insertion apparatus union joint adjacent to the guide flange
a rod apparatus having a rod configured to extend through the guide passage;
a connection adapter having a connection adapter housing with a connection adapter passage and an adapter flange extending outwardly from the connection adapter housing, the adapter flange used to form the insertion apparatus union joint, the connection adapter housing having an inner diameter greater than an outer diameter of the rod to allow a terminal end of the rod to pass therethrough.

19. The insertion apparatus of claim 18, wherein the coupling nut is configured to be connected to the insertion guide housing where the guide flange blocks the coupling nut from sliding past the guide flange, wherein the coupling nut is disposed at least partially above the guide flange, wherein the insertion guide further comprises:
a bleeder flowpath in fluid communication with the guide passage and extending through the insertion guide housing;
a bleeder valve assembly connected to the insertion guide housing and in fluid communication with the bleeder flowpath, wherein the bleeder valve assembly is detachably connected to the insertion guide housing
a safety link connector connected to the insertion guide housing; and
wherein the safety link connector is detachably connected to the insertion guide housing at a safety link connection.

20. The insertion apparatus of claim 19, wherein the coupling nut has a coupling nut shoulder and a plurality of coupling nut threads, wherein the guide flange has a guide flange shoulder, wherein the first adapter connector has a plurality of threads, and wherein the guide seal surface and the connection adapter seal surface are forced together by the coupling nut shoulder applying force to the guide flange shoulder as the first adapter connector is connected with the plurality of coupling nut threads.

* * * * *